(12) United States Patent
Palmer et al.

(10) Patent No.: US 8,588,508 B2
(45) Date of Patent: Nov. 19, 2013

(54) METHOD OR MATCHING HIGH-NUMERICAL APERTURE SCANNERS

(75) Inventors: Shane Roy Palmer, Oro Valley, AZ (US); Donis G. Flagello, Scottsdale, AZ (US)

(73) Assignee: Nikon Corporation, Tokyo (JP)

( * ) Notice: Subject to any disclaimer, the term of this patent is extended or adjusted under 35 U.S.C. 154(b) by 356 days.

(21) Appl. No.: 13/134,090

(22) Filed: May 27, 2011

(65) Prior Publication Data

US 2012/0039523 A1 Feb. 16, 2012

Related U.S. Application Data

(60) Provisional application No. 61/396,565, filed on May 28, 2010.

(51) Int. Cl.
*G06K 9/00* (2006.01)
*G06K 9/20* (2006.01)
*G06K 7/10* (2006.01)

(52) U.S. Cl.
USPC ............ 382/144; 382/119; 382/312; 235/454

(58) Field of Classification Search
USPC ......... 382/144, 116, 119, 151, 152, 154, 207, 382/209, 218, 312; 356/124, 237.1, 239.2; 359/1, 15, 17, 18, 22, 25, 196.1, 197.1, 359/209.1; 430/5; 235/435, 439, 454, 470
See application file for complete search history.

(56) References Cited

U.S. PATENT DOCUMENTS

| | | | | |
|---|---|---|---|---|
| 5,898,492 A | * | 4/1999 | Imaino et al. | 356/237.1 |
| 6,357,658 B1 | * | 3/2002 | Garczynski et al. | 235/462.01 |
| 6,557,658 B1 | * | 5/2003 | Enmeiji et al. | 180/236 |
| 6,788,400 B2 | * | 9/2004 | Chen | 356/124 |
| 7,444,616 B2 | * | 10/2008 | Sandstrom et al. | 716/53 |
| 7,873,204 B2 | * | 1/2011 | Wihl et al. | 382/144 |
| 8,014,560 B2 | * | 9/2011 | Nafarieh et al. | 382/100 |
| 8,057,967 B2 | * | 11/2011 | Ye et al. | 430/5 |
| 8,268,139 B2 | * | 9/2012 | Ryu et al. | 204/269 |

* cited by examiner

*Primary Examiner* — Sheela Chawan

(57) ABSTRACT

A method for matching characterizing features of an optical scanner against target characterizing features is provided. The characterizing features are produced from characterizing data (also referred to as a signature characteristic) produced from a scan of a mask by the scanner against target scanner signature characteristics produced from a scan of the mask by another optical scanner that produces the target scanner signature characteristic.

14 Claims, 18 Drawing Sheets

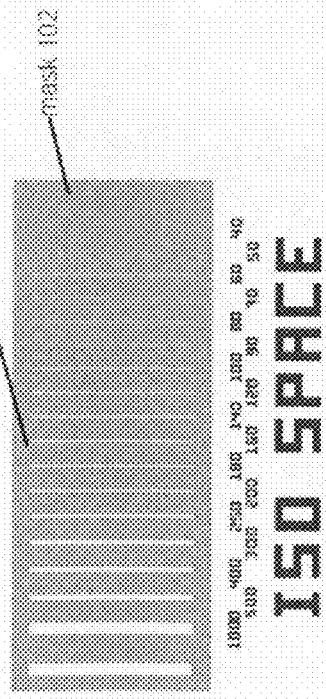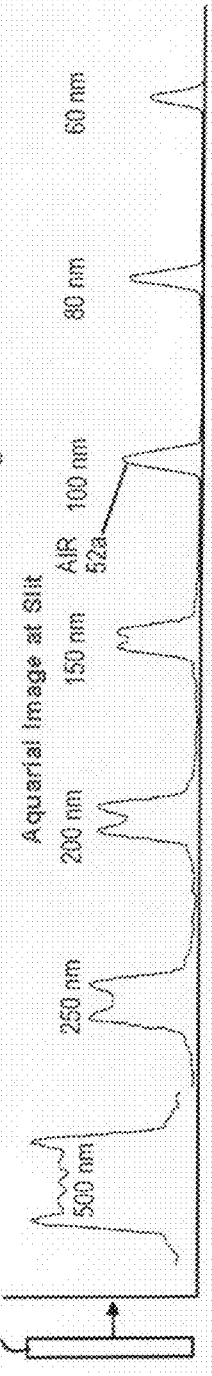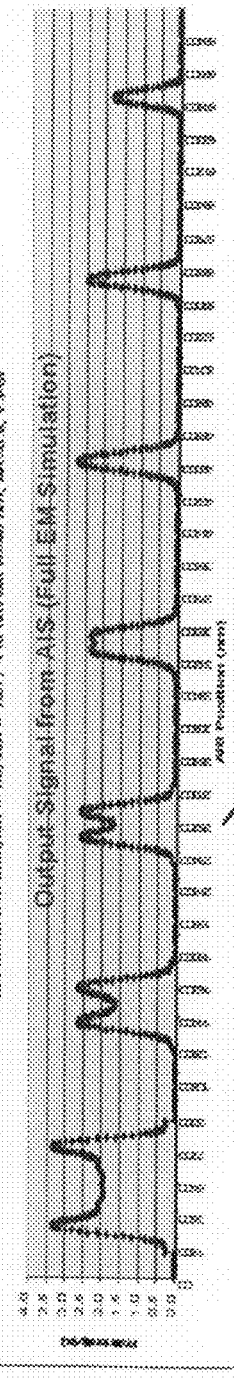
Figure 3a
Figure 3b
Figure 3c

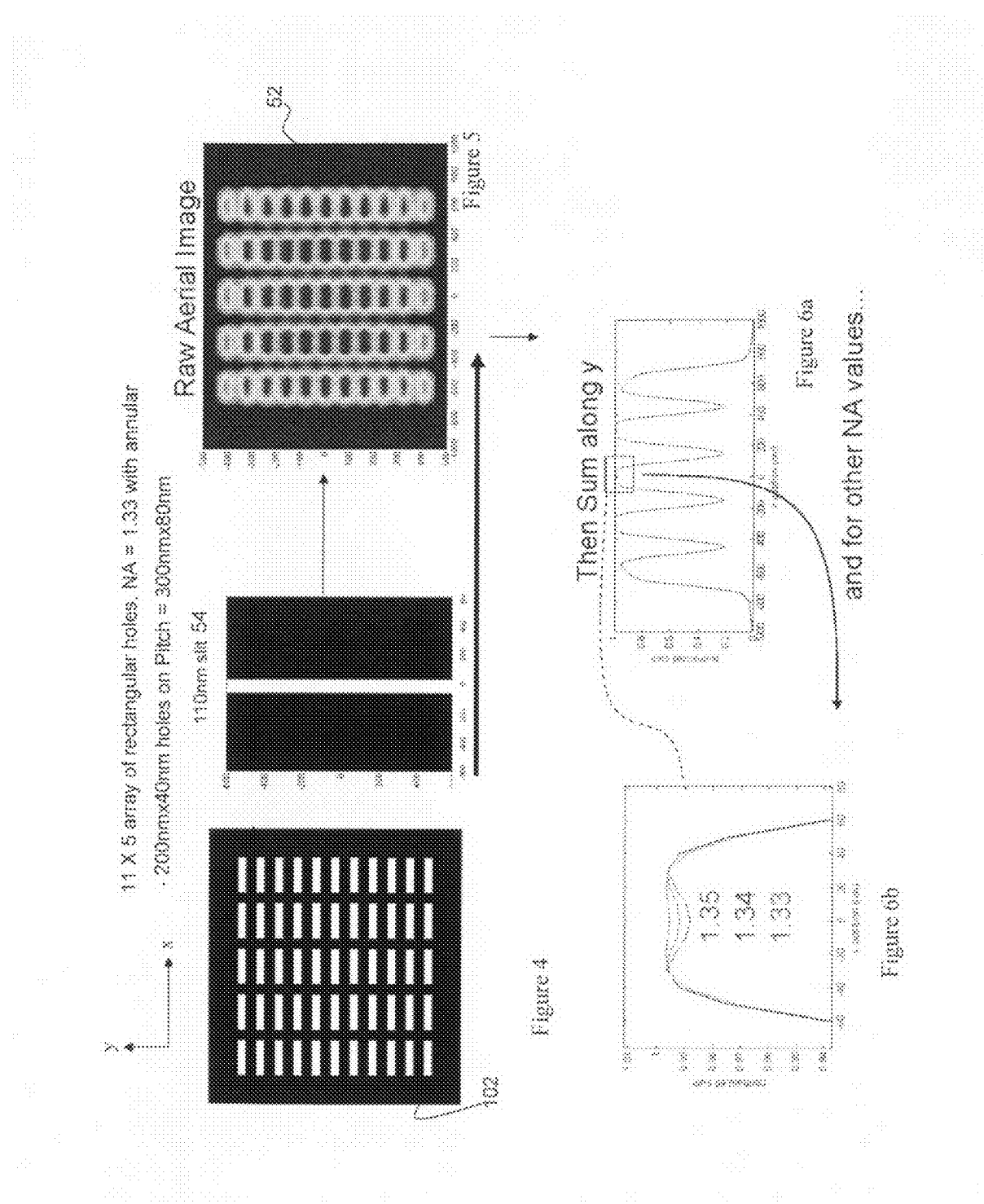

Experimental Data: Chirped Iso-Space AIS Mark

Experimental Sensitivity Results

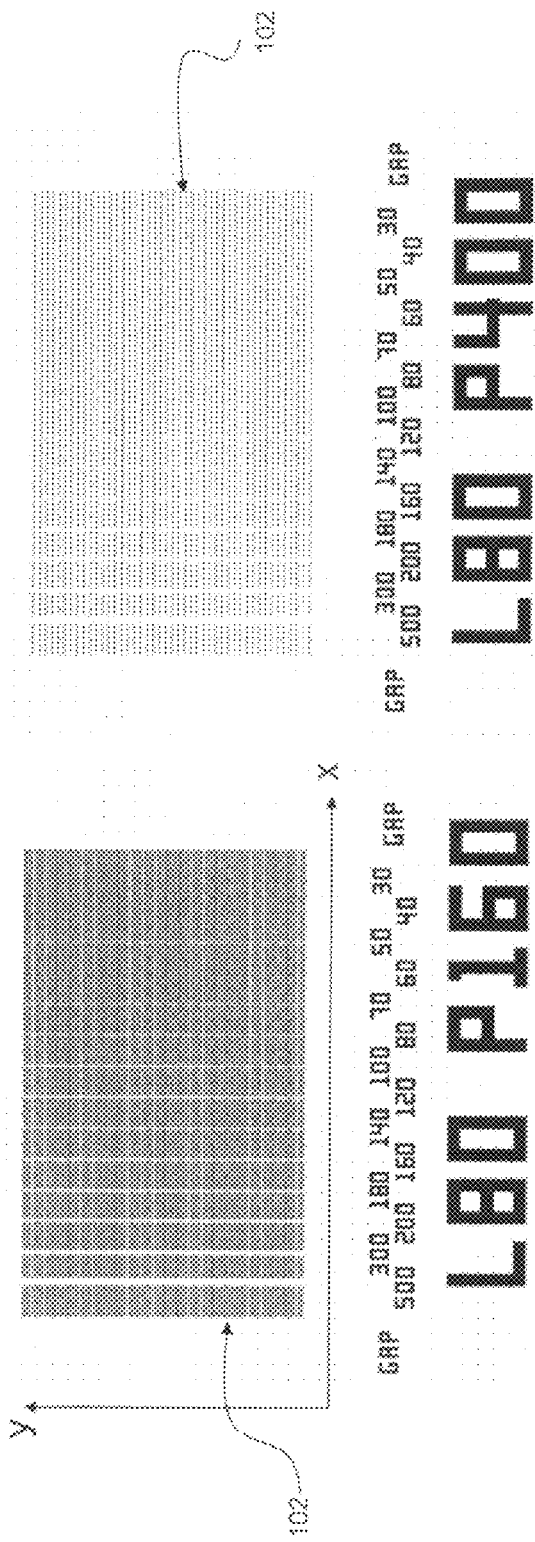

METHOD OR MATCHING HIGH-NUMERICAL APERTURE SCANNERS

RELATED APPLICATION/CLAIM OF PRIORITY

This application is related to and claims priority from provisional application Ser. No. 61/396,565, filed May 28, 2010, and entitled Method for Matching High-Numerical Aperture Scanners using 2-D AIS structures, which provisional application is incorporated by reference herein.

INTRODUCTION

The present invention relates to a method for matching the imaging characteristics of scanners of the type that optically image a substrate (e.g. in the production of a semi conductor wafer).

In applicants' experience, it is important to understand the characteristics of the tools (scanners) that are used in optical imaging of substrates. The tools produce images of the layers that when imaged to a photo resist on a substrate provide the patterns for the circuitry to be built on the semi conductor wafer. Different scanners may produce pattern errors that result in inconsistencies in the patterned substrates produced from the scanners, which is an undesirable result. The differences may be at a macro type level, or may be more subtle. Thus, most scanners have the capability to provide a measure of correction, at some level, to seek to produce products that are as close to each other as possible from the scanner. Correction capabilities can be based on measuring image performance, system aberrations, resist and patterning process performance.

SUMMARY OF THE PRESENT INVENTION

The method of the present invention is designed to enable matching characterization data of an optical scanner (referred to as the "signature characteristics" of the scanner) produced by a scan of a mask by the scanner against scanner characterization data produced from a scan of the mask by another optical scanner that produces the other scanner characterization data (also referred to herein as the "signature characteristics" of the other scanner).

Thus, a method for matching first and second optical scanners comprises
  a. scanning a mask on a first optical scanner, producing a first image from the scan of the mask by the first optical scanner, and producing from the first image a set of first signature characteristics;
  b. scanning the same mask on a second optical scanner, producing a second image from the scan of the mask by the second optical scanner, and producing from the second image a set of second signature characteristics for the second optical scanner; and
  c. comparing the first and second signature characteristics in predetermined ways designed to match features of the first and second scanners.

The method of the present invention preferably comprises producing the first and second images as first and second images in a predetermined medium, respectively. The images are preferably aerial images, where the medium is air, but the images can be aquarial, where the medium is liquid, or it can be the resist that is imaged (latent image). In addition, each of the first and second images is produced from a one dimensional scan of a two dimensional pattern on the mask (or reticle) and each of the first and second signature characteristics comprises any or all of the following characteristics: line widths, line gaps and pitch. In another feature of the method of the present invention, the mask includes a pattern that is predetermined to enable the first and second aerial images to produce the signature characteristics of the first and second scanners.

The method of the present invention can also include controlling at least one predetermined feature of at least one of the first and second scanners based on the comparison of the signature characteristics of the scanners.

Still further, the same principles of the present invention that are described for matching a pair of scanners can also be used for matching signature characteristics of an optical scanner to a set of target signature characteristics that have been predetermined by scanning the mask, producing a first image (preferably an aerial image) from the scan of the mask, and producing from the first image the characterizing data that forms the target signature characteristics.

The present invention provides a method that is designed to maximize the sensitivity of the scanners by extracting the signature characteristics of the scanners, preferably using an aerial image sensing (AIS) system. The method disclosed herein can be used on different scanners, where the signature characteristics of the scanners are compared and analyzed for the sensitivity changes to extract coefficients for matching the signature characteristics of the scanners.

These and other features of the present invention will become further apparent from the following detailed description and the accompanying drawings and exhibit.

BRIEF DESCRIPTION OF THE DRAWINGS AND EXHIBIT

FIG. 3a is an illustration of a mask pattern and a simulation showing the use of that mask pattern in the method of the present invention;

FIG. 3b is an aquarial image from illumination and projection of the mask pattern of FIG. 3b;

FIG. 3c shows characterizing data from simulation of a scan of the aquarial image of FIG. 3b;

FIG. 4 shows a mask pattern that can be used in a simulation of the method of the present invention;

FIG. 5 shows a simulation of a slit for scanning a simulation of a raw aerial image formed from the mask pattern of FIG. 4;

FIG. 6a shows simulated characterizing data from a scan of the aerial image of FIG. 5, by the slit shown in FIG. 5;

FIG. 6b shows an enlarged portion of the characterizing data of FIG. 6a;

as shown in FIG. 9) changes with varying illuminations;

FIGS. 15-17 show examples of mask patterns that can be used to produce different types of signature characteristics in the practice of the present invention;

Exhibit A shows color images of FIGS. 2-18.

DETAILED DESCRIPTION

As described above, the principles of the present invention are designed to enable matching signature characteristics of an optical scanner produced by a scan of a mask by the scanner against signature characteristics produced from a scan of the same mask by another optical scanner. The type of scanner to which the present invention would typically apply would be a high numerical aperture (N.A.) optical scanner that is typically used in a lithography system that images a mask or reticle to a substrate, e.g. in the production of a semi conductor wafer. The image produced from the mask, that is projected to the substrate is referred to as the aerial image, or the aquarial image, depending on whether the image projected to the substrate is projected through a medium that comprises air (the aerial image) or liquid (the aquarial image). The image produced on the substrate (actually the resist that is on the substrate) as a result of the projection of the aerial image), is referred to as the resist image. The method of the present invention is described herein in connection with aerial imaging that produces the signature characteristics of a scanner, and from that description the manner in which the present invention can be used in producing signature characteristics from other types of projected images (e.g. aquarial images, resist images) will be apparent to those in the art.

Figure 19:
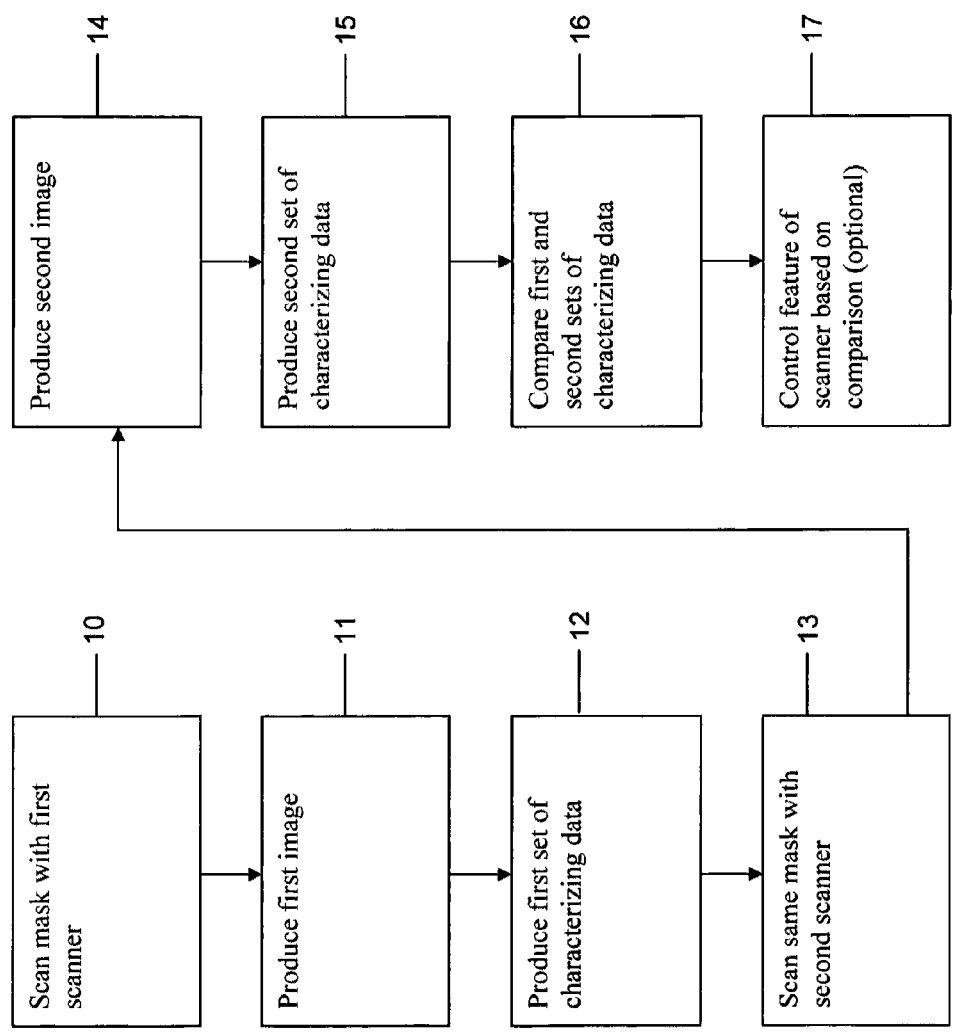
FIGS. 19 and 20 are flow charts showing the steps that comprise the method of the invention.

FIG. 19 is a schematic illustration of a method for matching scanners, which implements the method of the present invention. As shown in FIG. 19, in matching scanners, an initial step 10 is to scan a mask on a first optical scanner, produce a first image from the scan of the mask by the first optical scanner (step 11), and produce from the first image a first set of characterizing data (step 12). Then, as shown at step 13, the same mask is scanned on a second optical scanner, a second image is produced from the scan of the mask by the second optical scanner (step 14), and a second set of characterizing data is produced from the second image (step 15). Then, as shown at step 16, the first and second sets of characterizing data are compared in predetermined ways designed to match features of the first and second scanners.

Optionally, at least one predetermined feature of at least one of the first and second scanners can be controlled based on the comparison of the first and second sets of characterizing data (step 17). Control of features of the scanner is shown and described in connection with FIG. 18 herein.

In the method shown in FIG. 19: The first image produced (step 11) comprises a first image in a first predetermined medium, and the second image produced (step 14) comprises a second image in the same type of predetermined medium. The first image produced (step 11) preferably comprises a first aerial image and the second image produced (step 14) preferably comprises a second aerial image. Moreover, each of the first and second aerial images (steps 11, 14) is produced from a one dimensional scan of a two dimensional pattern on the mask. Additionally, each of the first and second sets of characterizing data (steps 12, 15) comprises any or all of line widths, line gaps and pitch. The mask that is scanned (steps 10, 14) includes a pattern that is predetermined to enable the first and second aerial images (steps 11, 14) to produce data (steps 12, 15) that comprises signature characteristics of the first and second scanners.

Figure 20:
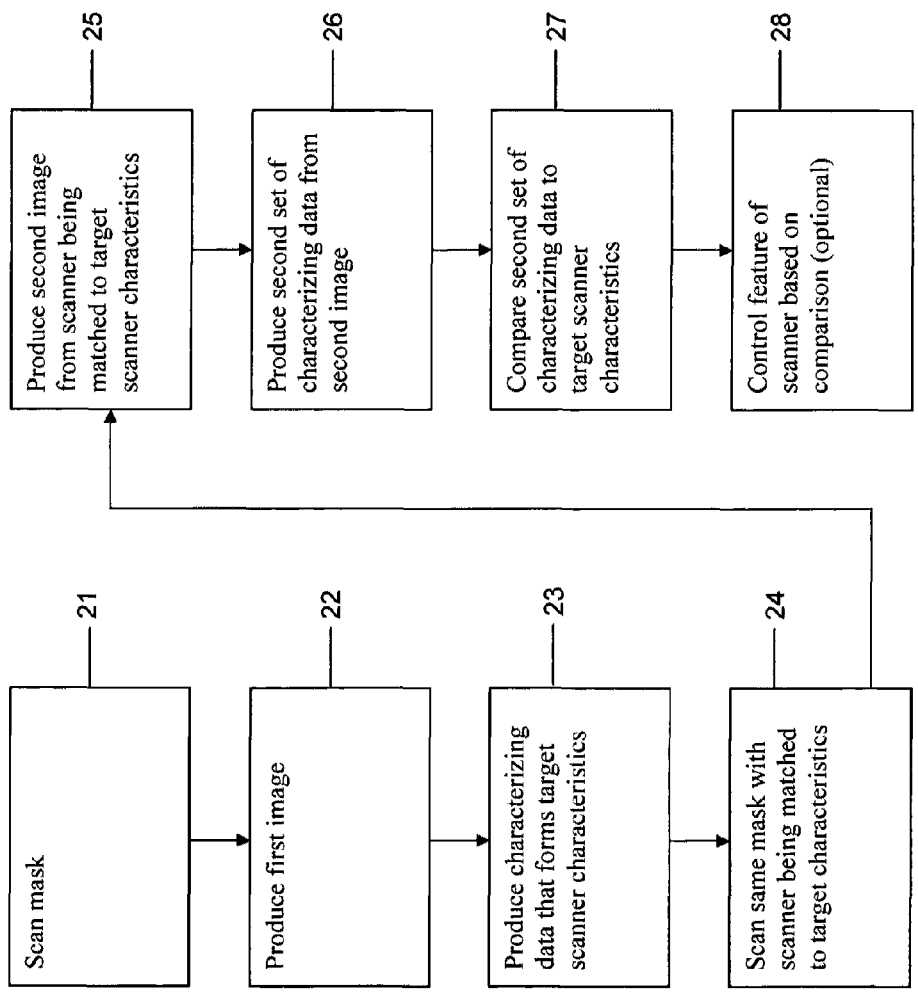

FIG. 20 is a schematic illustration of a method for matching characteristics of an optical scanner to a set of target scanner characteristics that also implements the method of the present invention. As shown in FIG. 20 an initial step 21 is to produce the target scanner characteristics by producing a first image from a first scan of a mask (step 22), and producing from the first image a first set of characterizing data that forms the target scanner characteristics (step 23). Then, as shown 24, the same mask is scanned on the optical scanner being matched to the target scanner characteristics, a second image is produced from the scan of the mask by the optical scanner (step 25), and a second set of characterizing data is produced from the second image (step 26). Then, as shown at step 27, the first and second sets of characterizing data are compared in predetermined ways designed to match features of the scanner to the target scanner characteristics.

Optionally, at least one predetermined feature of the scanner can be controlled based on the comparison of the first and second sets of characterizing data (step 28). Control of feature of the scanner is shown and described in connection with FIG. 18 herein.

In the method shown in FIG. 20: The first image produced (step 22) comprises a first image in a first predetermined medium, and the second image produced (step (step 25) comprises a second image in the same type of predetermined medium. The first image produced (step 22) preferably comprises a first aerial image and the second image produced (step 25) preferably comprises a second aerial image. Moreover, each of the first and second aerial images (steps 22, 25) is produced from a one dimensional scan of a two dimensional pattern on the mask. Additionally, each of the first and second sets of characterizing data (steps 23, 26) comprises any or all of line widths, line gaps and pitch. Then, as shown at step 27, the first and second sets of characterizing data are compared in predetermined ways designed to match features of the scanner to the target scanner characteristics.

Figure 1:
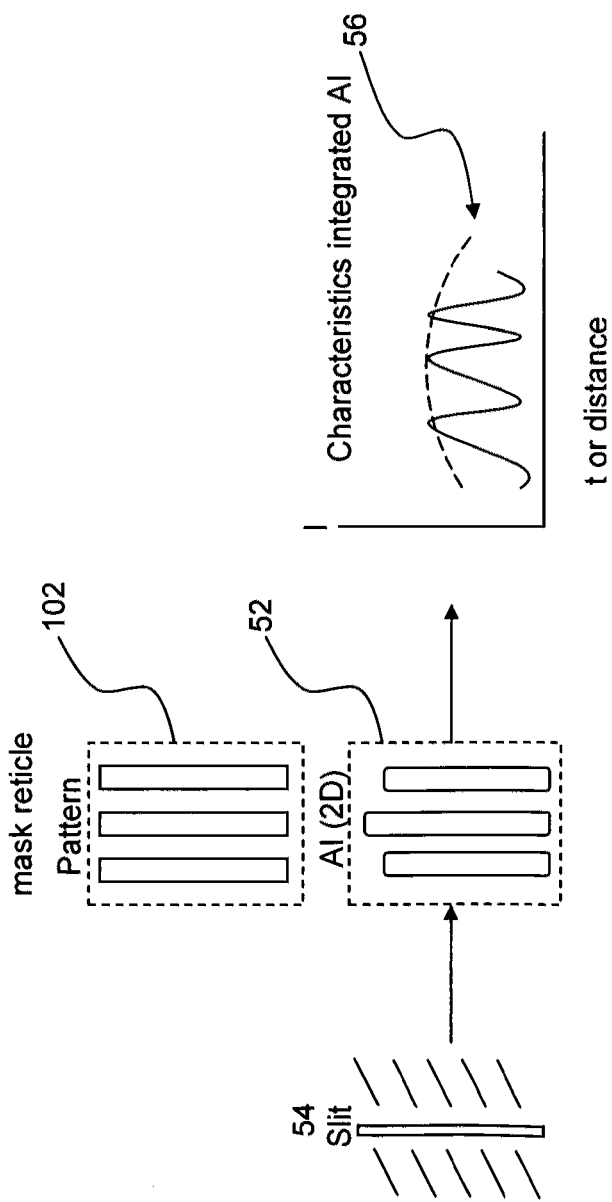
FIG. 1 is a schematic illustration of basic scanning concepts that are useful in the method of the present invention.

FIG. 1 schematically illustrates scanning concepts for an aerial imaging system that are useful in the method of the present invention. In a typical photolithographic image system, a mask (or reticle) 102 has a pattern that is illuminated and projected to a substrate (e.g. a substrate for producing a semi conductor wafer). The type of equipment that illuminates the mask 102 is described in connection with FIG. 2. The image that is projected to the substrate by an aerial imaging system is known as the "aerial image" or AI. That aerial image would typically be a two dimensional image of a portion of an electronic circuit, which is imaged onto a photoresist on the substrate. The photoresist is then developed, to produce a pattern that is used in defining the electronic circuit on the substrate.

In the method of the present invention, the mask 102 is illuminated by a scanner and its pattern projected to create an aerial image 52 of the mask (FIG. 1). That aerial image 52 is further processed, by the method of the present invention, to produce characterizing data that forms the characteristic signature of the scanner. Then, the same mask is illuminated by another scanner and its aerial image is also processed in accordance with the present invention, to produce characterizing data that forms the characteristic signature of the other scanner. The characteristic signatures of both scanners can then be compared, so as to provide information that enables e.g. matching of scanners.

Thus, in FIG. 1, a slit 54 scans the aerial image 52 produced from illumination and projection of the image of the mask 102 by the scanner. The scan of the aerial image produces data that is integrated, to produce characterizing data 56 that forms a signature characteristic of the scanner. Another scanner can then be used with the same mask 102, to produce an aerial image that is scanned by the slit 54 and produces characterizing data 56 that is the signature characteristic of the other scanner. Comparison of the signature characteristics of both scanners produces information that enables e.g. matching of scanners. Also, the scan of the aerial image of the first scanner, and the signature characteristics of that first scanner, can also be stored as target signature characteristic information, and the signature characteristics of a new scanner can be compared to the target signature characteristics, by scanning the same mask with the new scanner, and producing the signature characteristic information, according to the process of the present invention.

Figure 2:
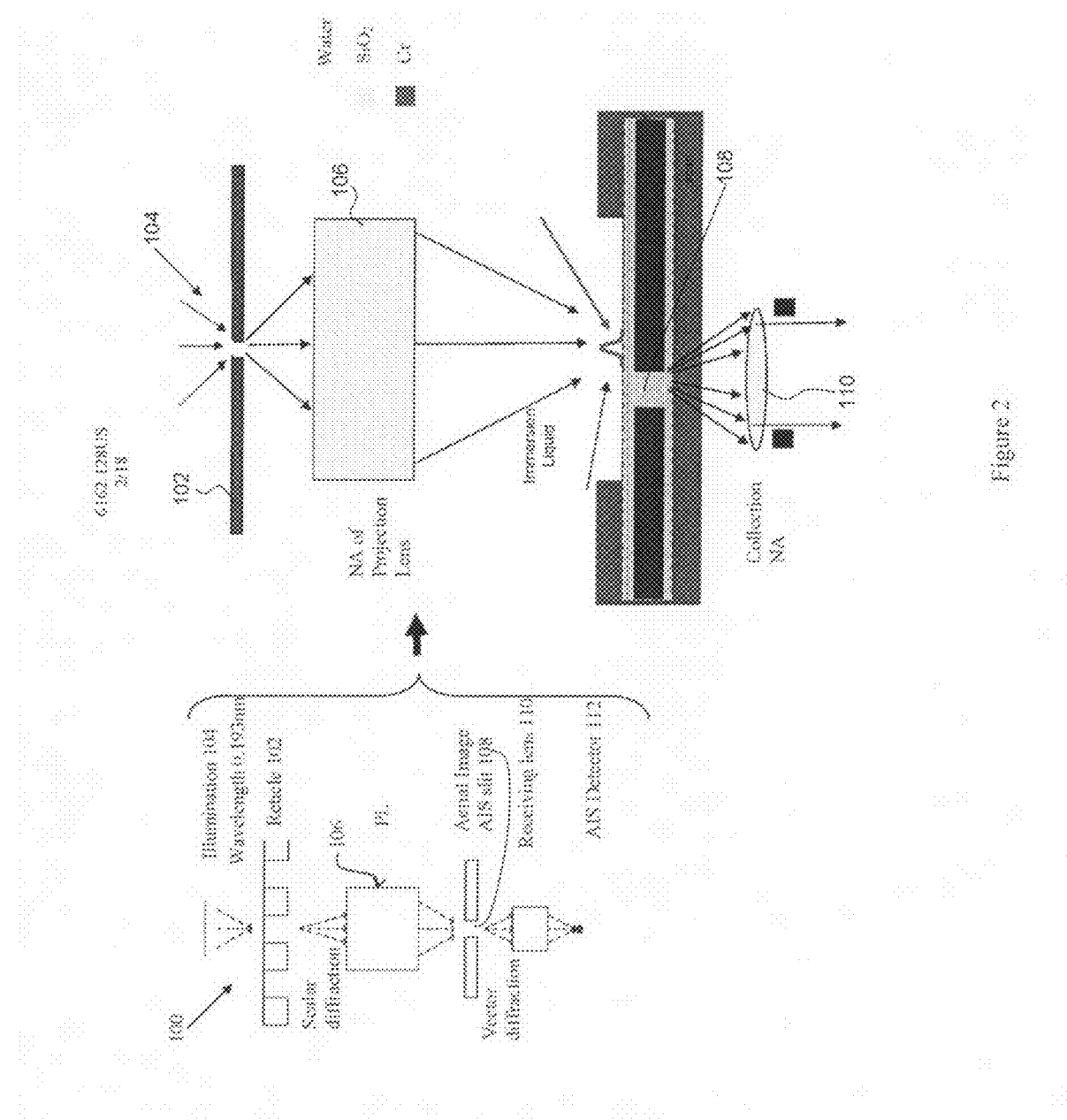
FIG. 2 is a schematic illustration of scanning equipment techniques for producing and measuring the aerial image, in the method of the present invention.

FIG. 2 schematically illustrates scanning equipment and processing techniques for producing and measuring the aerial image, in the method of the present invention. In FIG. 2, the left side shows the basic components of an optical scanner 100 that produces an aerial image for use in implementing the present invention, and the right side illustrates the processing techniques for producing and measuring the aerial image. The scanner 100 can be designed, e.g. according to U.S. application Ser. No. 09/841,044, filed Apr. 25, 2001 (published as US published application 2002/0041377), which is incorporated herein by reference. The scanner 100 utilizes the mask or reticle 102 (described further below) that is illuminated by a source 104 and the image of the mask is directed by projection optics 106 (also referred to as projection lens PL) to produce the aerial image (or aquarial image as described herein). The aerial image is then captured by an aerial image sensing system (AIS) that comprises a slit 108, a receiving lens 110 and to a detector 112 at which the aerial image is recorded. The scan of the recorded aerial image, and the generation of the signature characteristics of the scanner, is then performed in the matter schematically illustrated and described in FIG. 1, and described and illustrated further herein.

When the image projected by the projection optics and used in the method of the present invention is produced in a liquid medium, rather than air, the image is referred to as an "aquarial image". Moreover, when the projected image is the image produced in the resist that is on the substrate, the image is referred to as the "resist image".

FIG. 3 is an illustration of a mask pattern and a simulation showing the use of that mask pattern in a method according to the present invention The mask 102 has "chirped marks", which are marks with changing characteristics (width, spacing, frequency), as will be recognized by those in the art. Illumination and projection of the pattern of the mask 102 by a scanner produces an image 52a, which in the simulation of FIG. 3 is an aquarial image. In the method of the present invention, the aquarial image is scanned by a slit 54a having a width about the same as line 101 of the mask 102, to produce characterizing data 56 that is analyzed and used to produce signature characteristics for the scanner that produced the characterizing data 56. In the most basic implementation of the present invention, the scan of the two dimensional (2D) mask 102 with the type of mask pattern of FIG. 3 is in one direction (1D) but produces characterizing data in respect to features that include line widths, line gaps and pitch, which applicants believe are fundamental features for characterizing a scanner. Those features are considered characterizing data (or signature characteristics) for a scanner, in a method according to the present invention.

FIG. 3a is an illustration of a mask pattern and a simulation showing the use of that mask pattern in the method of the present invention. FIG. 3b is a raw aquarial image from illumination and projection of the mask pattern of FIG. 3a. FIG. 3c shows characterizing data from simulation of a scan of the aquarial image of FIG. 3b. The mask 100 has "chirped marks", which are marks with changing characteristics, as is know in the art. As shown by FIG. 3b, illumination and projection of the pattern of the mask by a scanner produces an image 52a, which in the simulation of FIG. 3b is an aquarial image. The aquarial image is scanned by a slit 54a having a width about the same as the mask mark 101, to produced characterizing data 56a (FIG. 3c) that is analyzed and used to produce a signature for the scanner that produced the characterizing data. In the method of the present invention, the scan of a 2D mask 100 with the type of mask pattern of FIG. 3a is in one direction (1D) but produces an aerial image 54a (FIG. 3b) that enables analysis of the aerial image in respect to features that include line widths, line gaps and pitch, which applicants believe are fundamental features for characterizing a scanner. Those features are considered characterizing data for a scanner, in the method of the present invention.

Production of characterizing data from a mask with features such as shown in FIGS. 3a-c is used to produce the characterizing data (the signature characteristics) that is used in matching scanners, in accordance with the present invention. The concept of "matching" scanners involves generating the characterizing data (e.g. in the form of graphical curves) that are representative, e.g., of the scanner sensitivity at certain scanner settings. By using the same mask for producing the aerial images of both scanners, and by comparing the signature characteristics from both scanners, the features of the scanners can be adjusted (to the extent allowed by the capabilities of the scanners) to make their signature characteristics as close as possible. Moreover, by matching the signature characteristics of one scanner to a set of target signature characteristics (produced by a scan of the same mask by a target scanner system), the features of the scanner can be adjusted (as possible) to bring the signature characteristics of the scanner as close as possible to the target signature characteristics.

In scanning the aerial image of a mask pattern, according to the method of the present invention, the scanning slit detector signal is approximately given by the integration of the convolution of the slit, $F(x,y)$, and the aerial image produced by the scanner, $S(x)$. In mathematical terms this can be expressed as:

$$D(x)=\int [S(x) \otimes F(x,y)]dy = \int \int S(x')F(x-x',y)dx']dy$$

changing the order of integration gives $$D(x)=\int S(x')[\int F(x-x',y)dy]dx=\int S(x')F'(x-x')dx$$

where F' is the sum along y of the aerial image

Hence, for a 2D mask pattern one would sum the scanned aerial image in the direction perpendicular to the scan. A 1D convolution with the slit can be performed to get the modeled aerial image sensing signal.

FIGS. 4-6b schematically show an example of a sequence of steps for producing characterizing data, in a method according to the present invention. FIG. 4 shows a simulated mask comprising 11×5 array of rectangular holes, NA=1.33 with annular–200 nm×40 nm holes on Pitch=300 nm×80 nm. FIG. 5 shows a 110 nm slit 54 for scanning a raw aerial image formed from the mask pattern of FIG. 4. FIG. 6a shows simulated characterizing data from the scan of the aerial image of FIG. 5, by the slit shown in FIG. 5; and FIG. 6b shows an enlarged portion of the characterizing data of FIG. 6a, including simulated scans at different numerical apertures.

Figure 7:
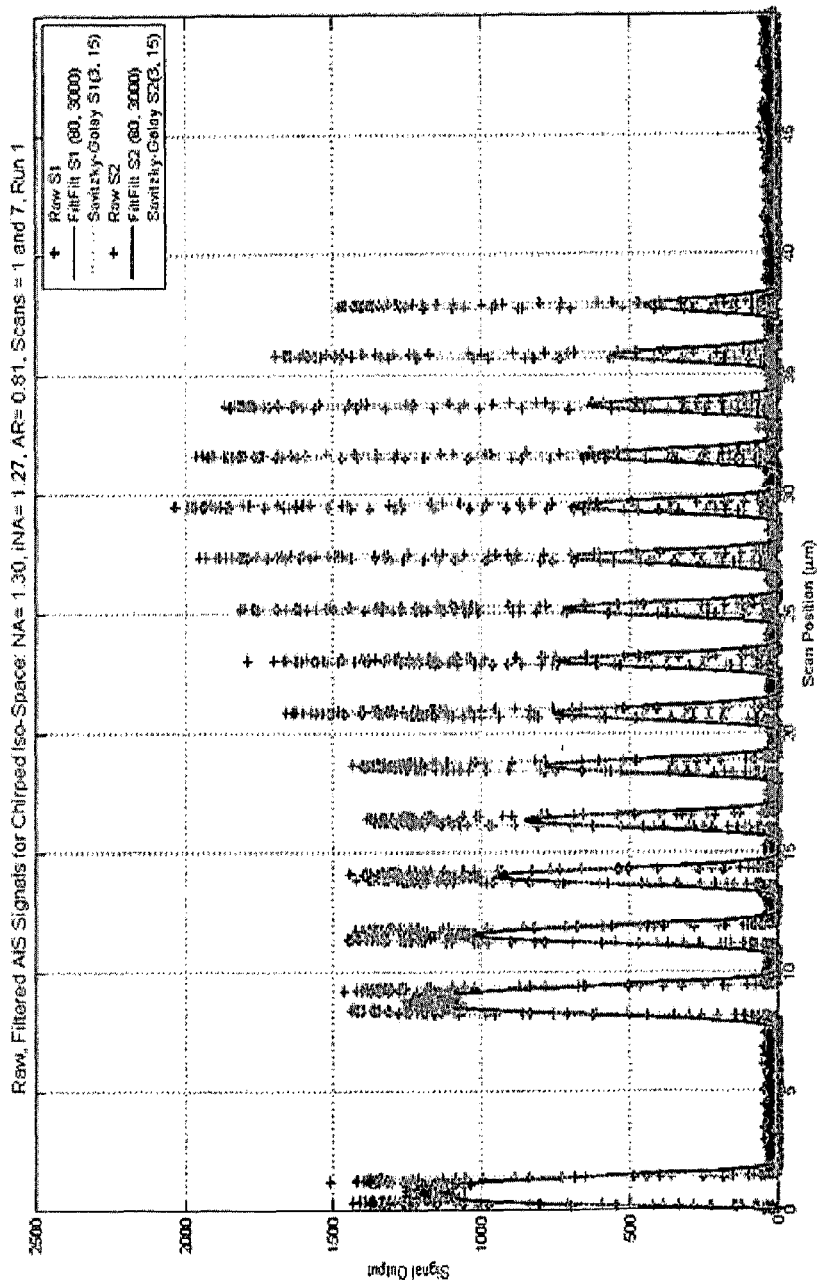
FIG. 7 is an example of data that corresponds to the simulation shown in FIGS. 3a-c.
Figure 8:
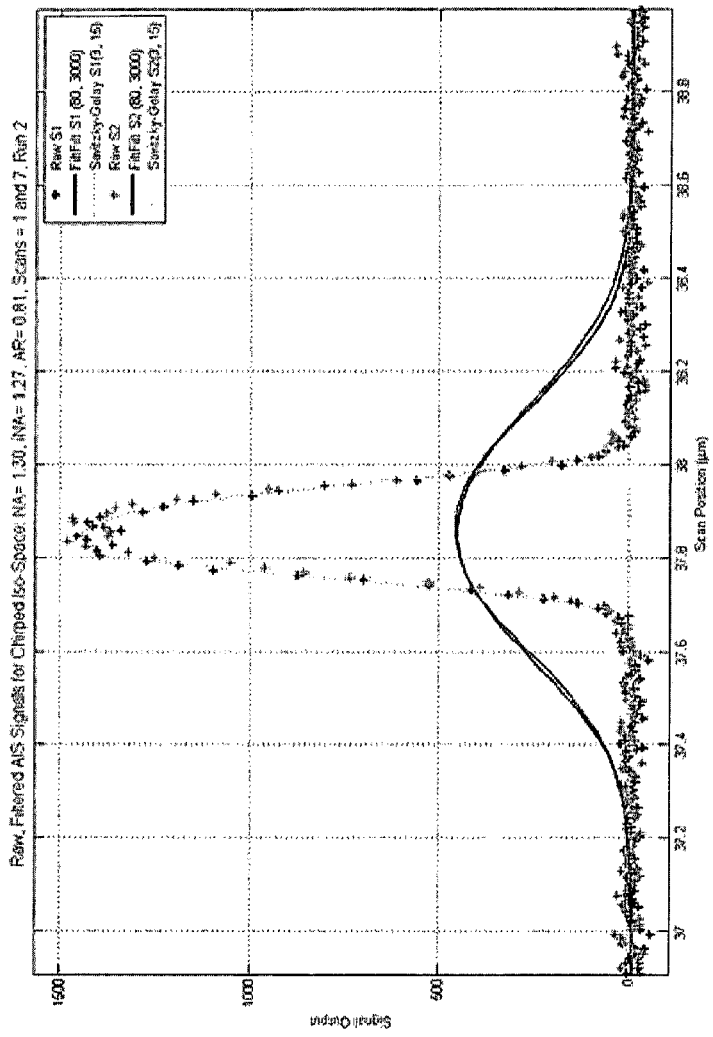
FIG. 8 is an expanded view of the rightmost peak shown in FIG. 7.
Figure 9:
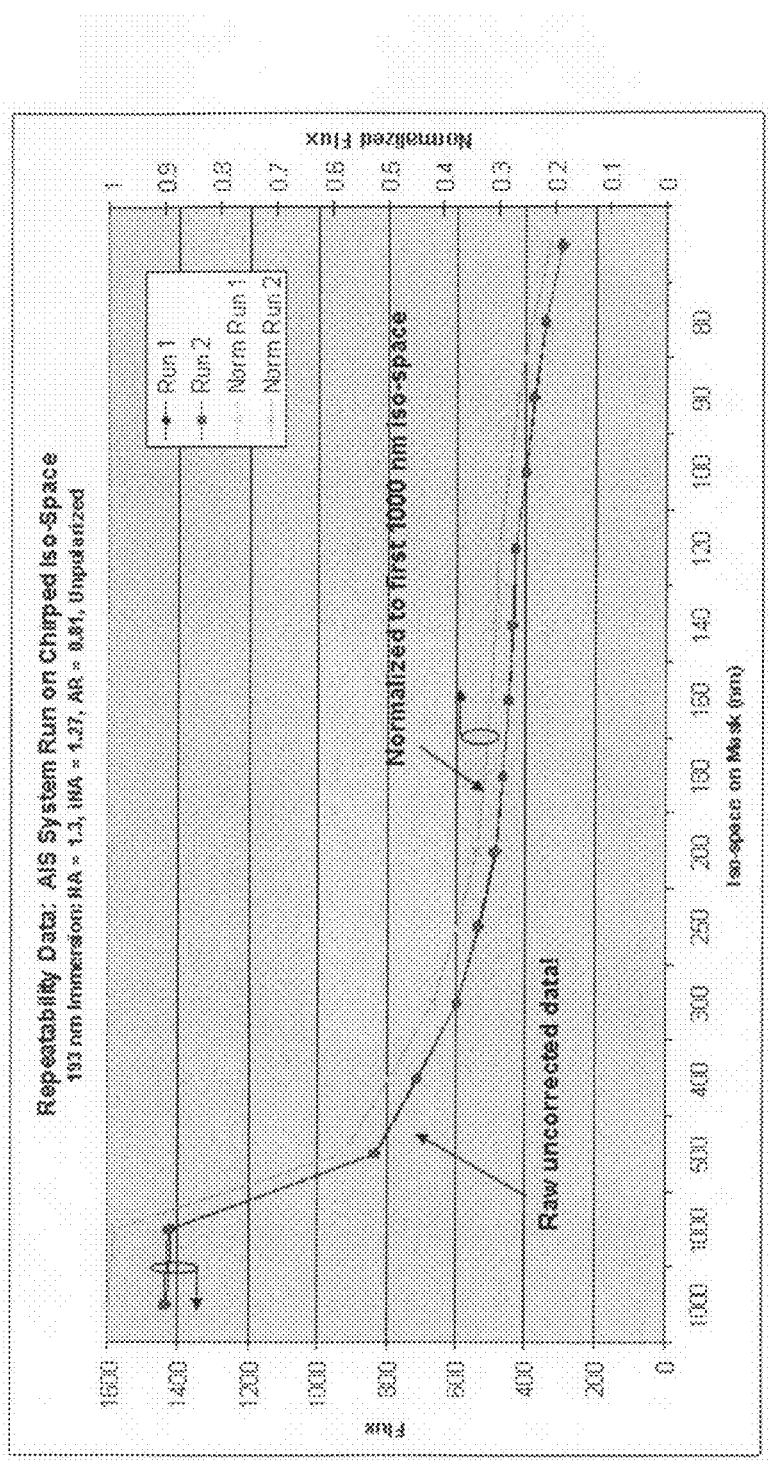
FIG. 9 shows signature characteristics resulting from the data of FIGS. 7 and 8 for two separate runs at two different times, using the same mask pattern (where the flux is defined as the area under the curve for each space)

FIGS. 7-9 show further details of the manner in which signature characteristics for a scanner are produced, according to the present invention. FIG. 7 is an example of experimental data that corresponds to the simulation of FIGS. 3a-c; FIG. 8 is an expanded view of the right most peak shown in FIG. 7; and FIG. 9 shows signature characteristics of FIGS. 7 and 8 for two separate runs at two different times, using the same mask patterns (where the flux is defined as the area under the curve for each space in FIG. 9). In FIG. 7, two of 21 scans are shown (1 & 7) over the chirped-iso space (short for "isolated space" mask. The 21 scans are filtered and then averaged to improve the signal to noise ratio (SNR). The raw data is shown as "+" marks. In FIG. 8, the plot shows the expanded view of the raw and filtered data for the 70 nm iso-space feature (only two of 21 scans). The FFT (fast Fourier transform) filtered data is shown by the red and blue lines (in the color version of FIG. 8 shown in Exhibit A) which are used to center the sub-peaks in each scan. The sub-peaks are analyzed using a spline to the Savitzky-Golay filtered data (shown by the dotted lines). FIG. 9 shows a plot that is effectively the signature characteristics of the scanner that produced the characterizing data of FIGS. 7 and 8. FIG. 9 demonstrates the repeatability of results by showing the close overlap of the two runs, for both normalized and raw data.

Figure 10:
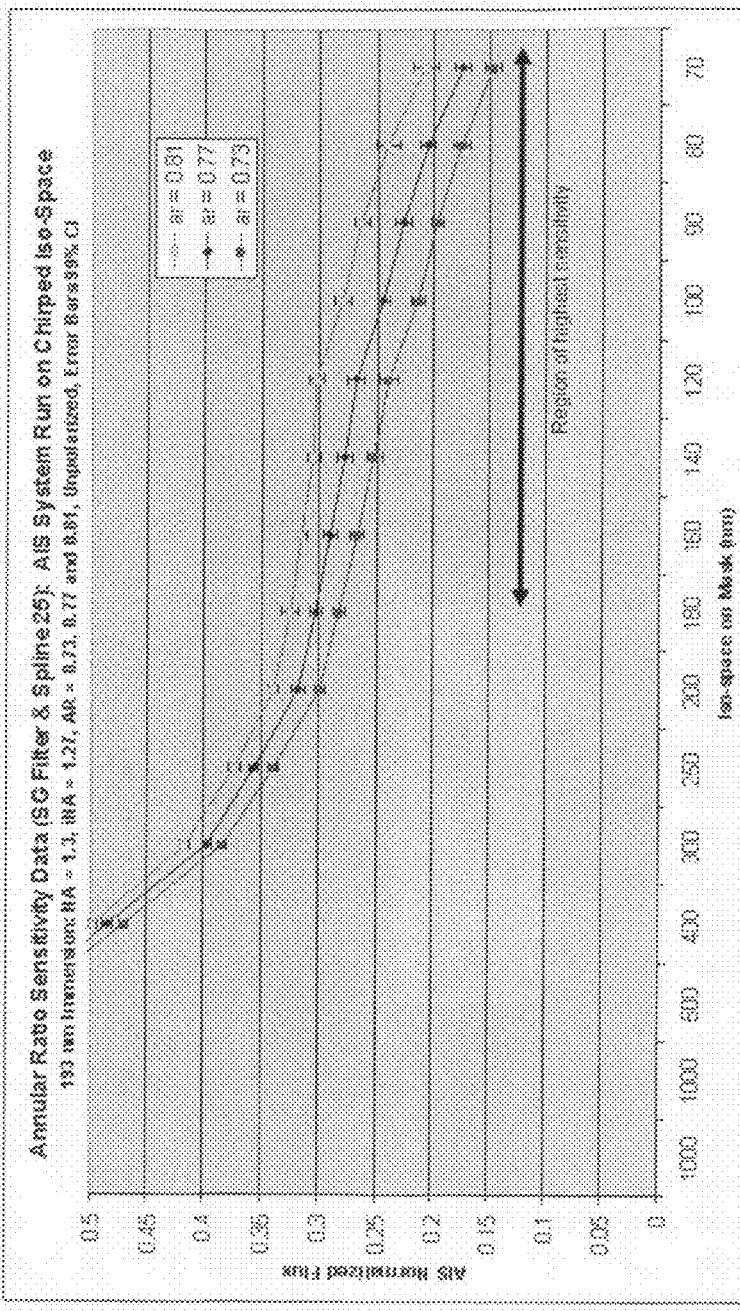
FIG. 10 is an example of how the signature characteristics of a scanner (e.g.

FIG. 10 is an example of how the signature characteristics of a scanner (e.g. as shown in FIG. 9) changes with varying illuminations. FIG. 10 demonstrates sensitivity to illumination change, in a method according to the present invention. FIG. 10 shows an example of AIS sensitivity for the chirped iso-space to annular ratio change, where the metric is flux, and where "annular ratio" is the inner illumination numerical aperture (N.A.) over the outer illumination N.A. In FIG. 10, each point represents a different iso-space in the chirped feature. The error bars represent the +/−99% confidence interval level.

Figure 11:
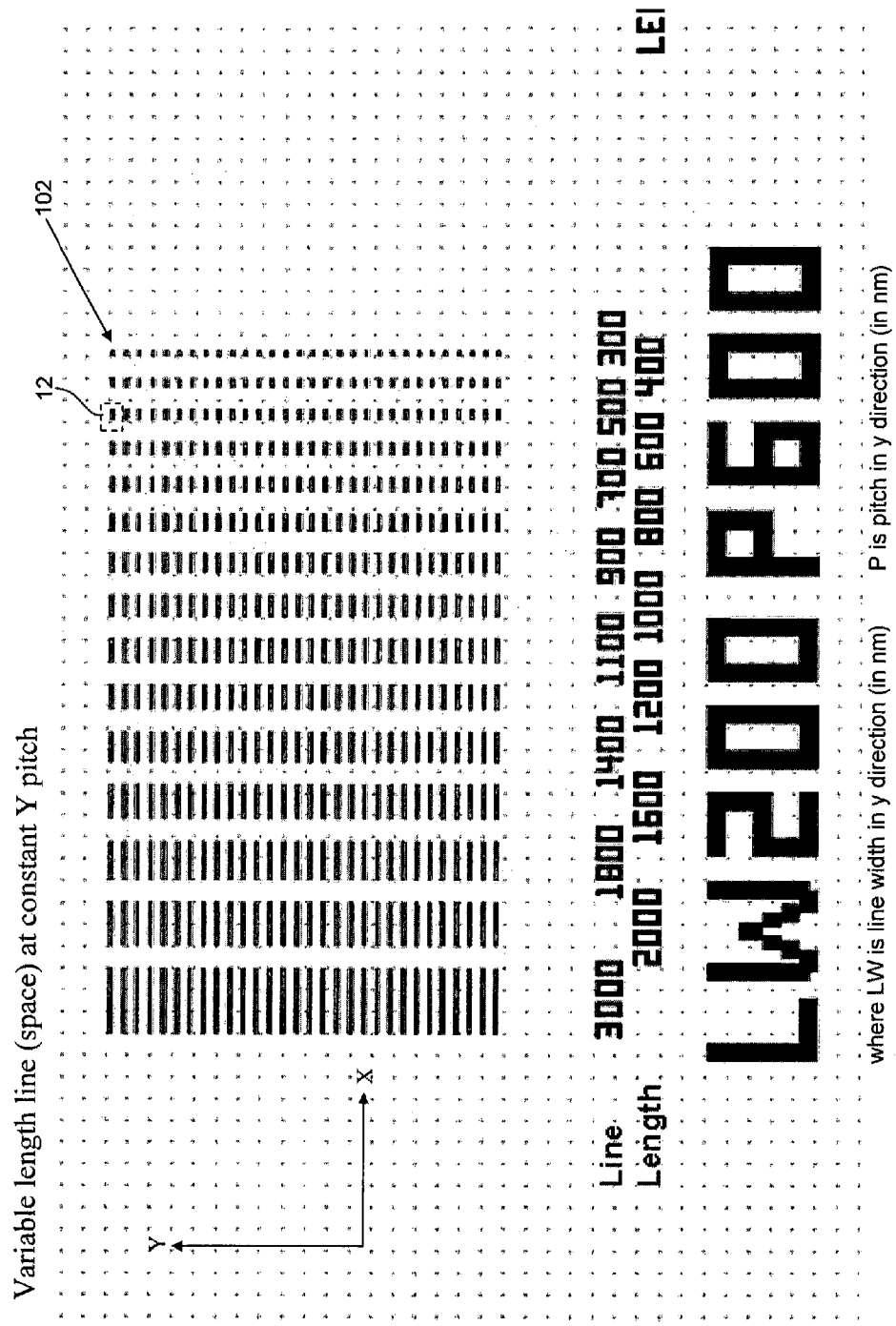
FIG. 11 is an example of a mask pattern that can be used in the method of the present invention; where the mask pattern comprises a constant gap, and segmented lines (or spaces) of varying length.
Figure 12:
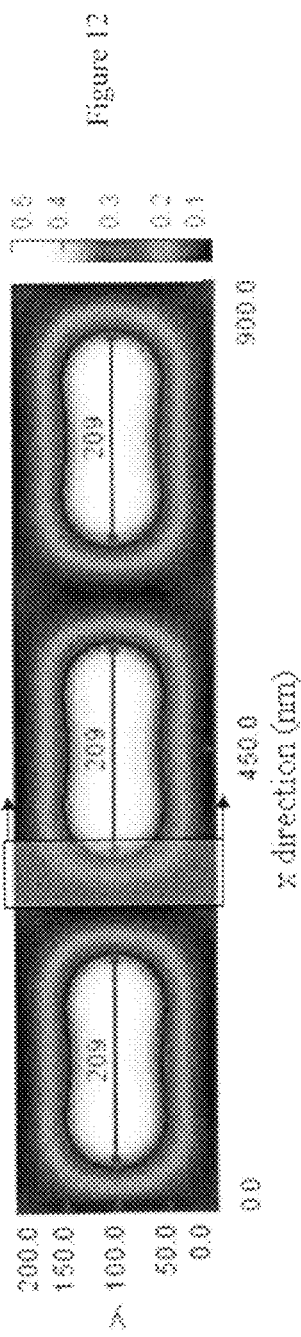
FIGS. 12, 12a, 12b show a portion of a simulation of the method of the present invention with the mask pattern of FIG. 11.
Figure 12B:
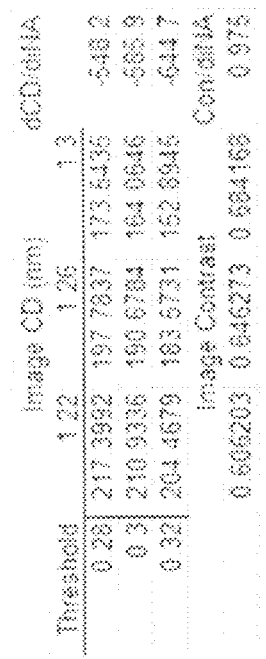
Figure 12A:
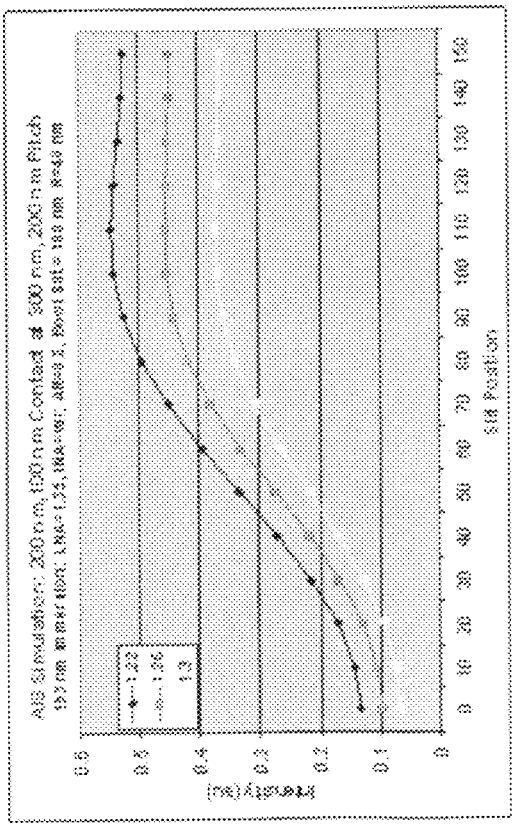

FIGS. 11 and 12, 12a and 12b illustrate a mask pattern and simulation performed with a portion of that mask pattern (the portion of the mask pattern shown at 12 in FIG. 11), according to the method of the present invention. In FIG. 11 the mask pattern comprises horizontal, varying length lines with a constant gap. The segmentation and line widths can change. FIG. 12 shows the small portion 12 of FIG. 11, and along with FIGS. 12a and 12b shows a partial simulation implementing the method of the present invention with the mask pattern of FIG. 11. In FIG. 12, the top illustration shows a scan of the aerial image resulting from the small portion 12 of FIG. 11. The bottom left graph in FIG. 12b shows the partial simulation from the MS scan of that aerial image. The data on the bottom right (FIG. 12b) shows the sensitivities for the critical dimension (CD) metric and the contrast metric against changing imaging N.A. These figures demonstrate the use of the method of the invention with a mask pattern with a constant gap and segmented varying line widths.

Figure 13:
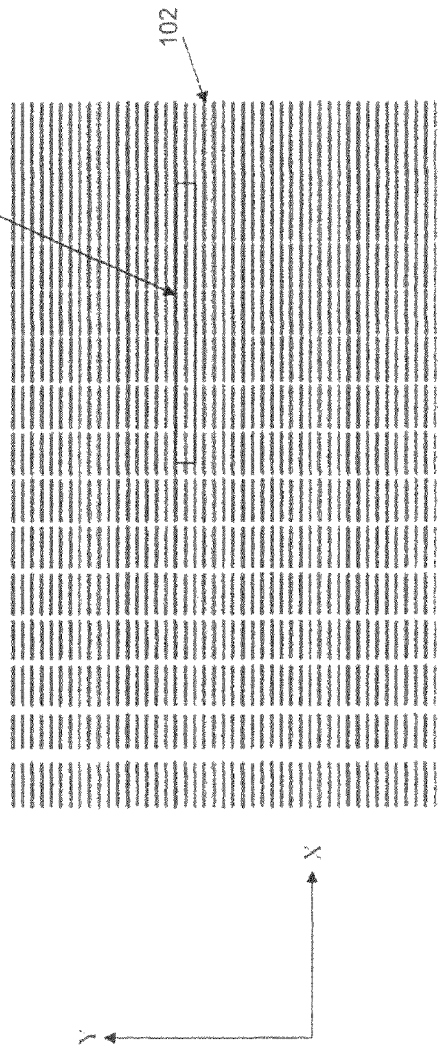
FIG. 13 is an example of a mask pattern that can be used in a method according to the present invention, where the mask pattern comprises fixed (constant) line lengths at constant y width and y pitch and varying x gaps.
Figure 14:
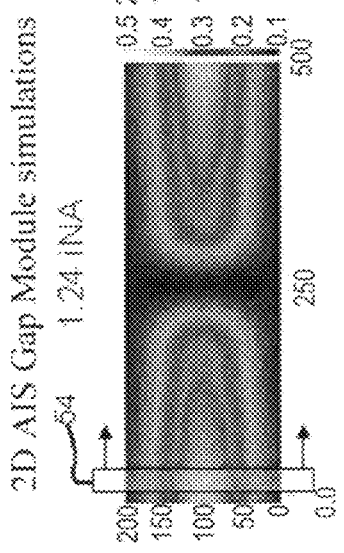
FIGS. 14 and 14a show a portion of a simulation of the method of the present invention with the mask pattern of FIG. 13.
Figure 14A:
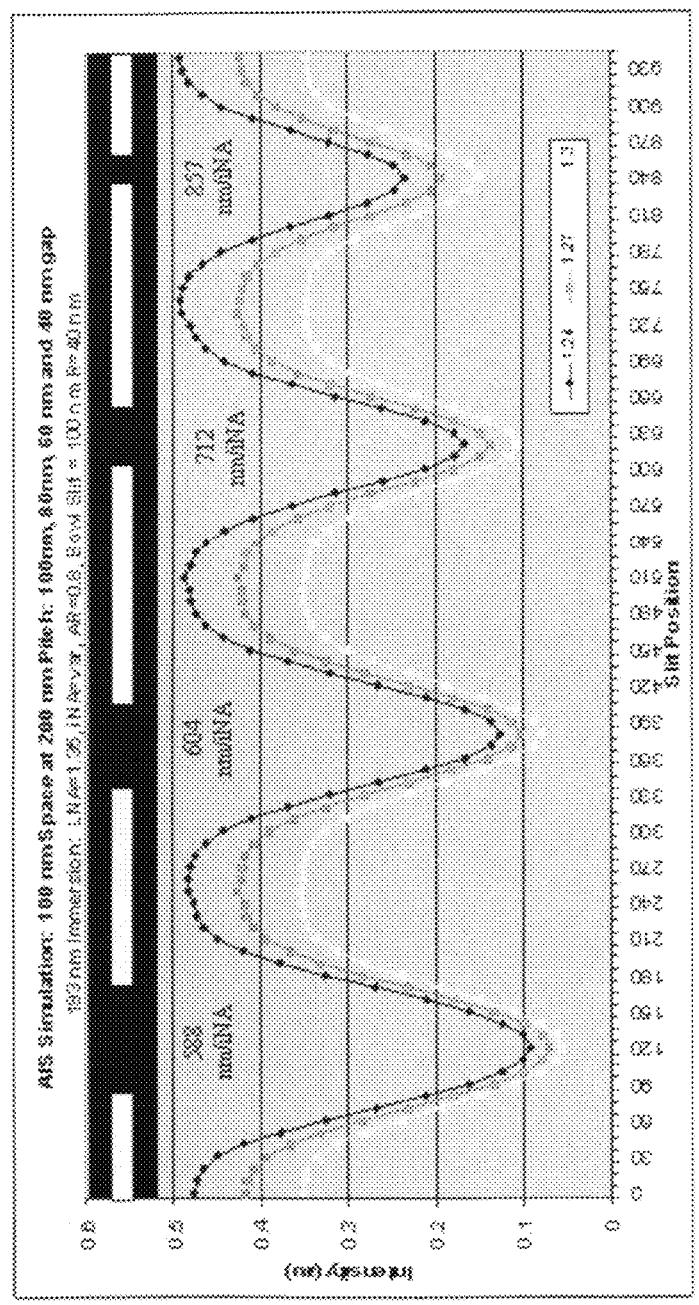
Figure 13:
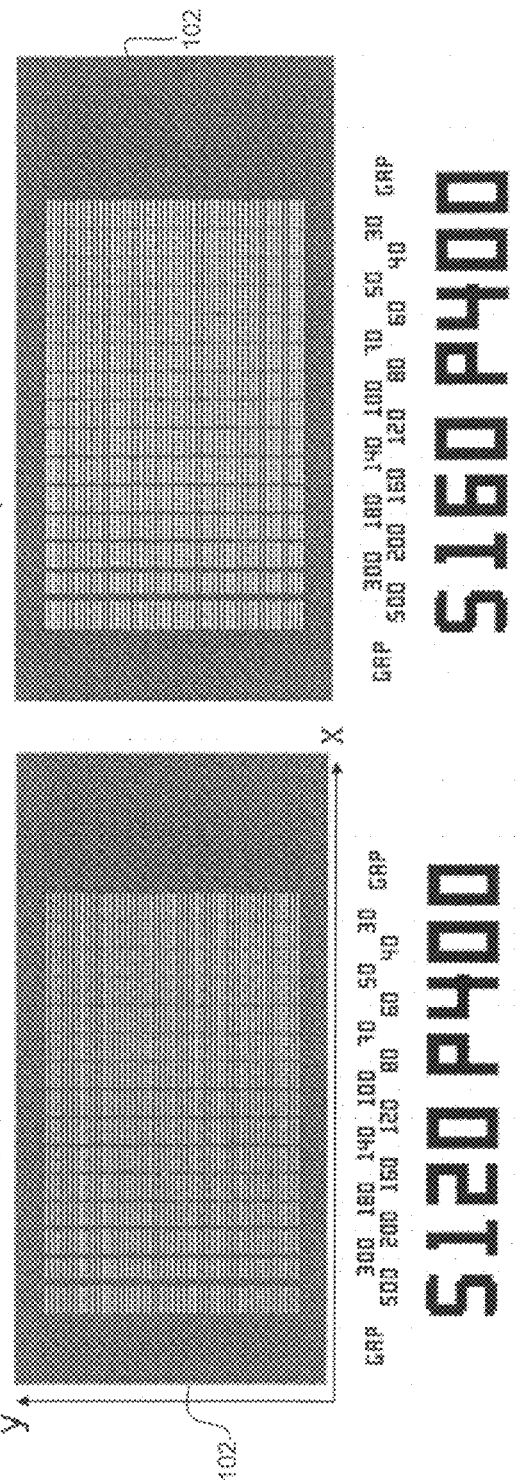

FIGS. 13, 14 and 14a illustrate another mask pattern and simulation performed with a portion of that mask pattern (the portion identified at 14 in FIG. 13), in the present in the method of the present invention. In FIG. 13 the mask pattern comprises lines with constant length, and gaps of varying width (x direction). FIG. 14 shows the aerial image produced by a portion of the varying gap structure. FIG. 14a represents the resultant signature curve from the AIS scan. These figures demonstrate the use of the method of the invention with a mask pattern with lines of constant length and varying gap lengths. In FIGS. 14, 14a applicants note that the projected image of 80 nm gap for 100 nm spaces at 200 nm pitch at 1.24, 1.27 and 1.30 illumination-NA. The gap size (dark region between the space) after the slit and collection optics was determined to be 87 nm, 102 nm and 127 nm for the 1.24, 1.27 and 1.30 iNA, respectively.

Figure 17:
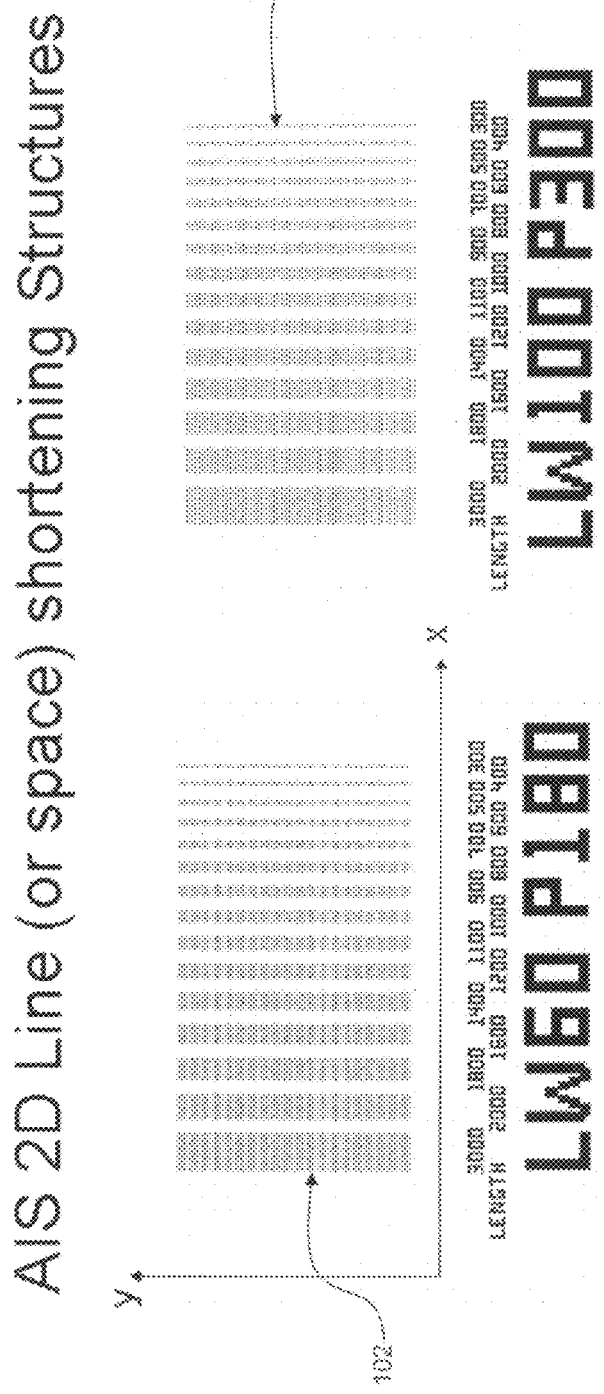

FIGS. 15-17 show the types of mask patterns that can be used to produce signature characteristics from a scanner, in the method of the present invention. The mask patterns may comprise any or all of line widths, line gaps and pitch. Thus, FIG. 15 shows a mask pattern in which variation of 1 μm long spaces is provided at different widths and pitch values versus a change in the gap distance between the ends of the spaces. Moreover, in FIG. 15 the mask pattern comprises 120 nm wide spaces at 400 pitch (y direction). In the x direction, the spaces are 1000 nm long with a changing gap size between the row of spaces beginning with 500 nm, then 300 nm, 200 nm. FIG. 16 shows a mask pattern with lines versus pitch and a varying gap. The length of the line is 1000 nm and the gap between the end of the line varies from 500 nm, 300 nm, 200 nm, etc. FIG. 17 shows examples of structures used to measure the line-end pullback, or shortening of line (or space) lengths, as it is often referred. Here the lines (or spaces) have a fixed width (y direction) at constant pitch (left shows a 60 nm line at a pitch of 180 nm (also in y direction). The length of the lines going from left to right are varied from 3000 nm, 2000 nm, 1800 nm, etc. The gap between the ends of the row of lines is fixed at 1000 nm. These figures are examples of mask patterns that produce signature characteristics that may vary characteristics such as line widths, line gaps and pitch in the practice of the method of the present invention.

Figure 18:
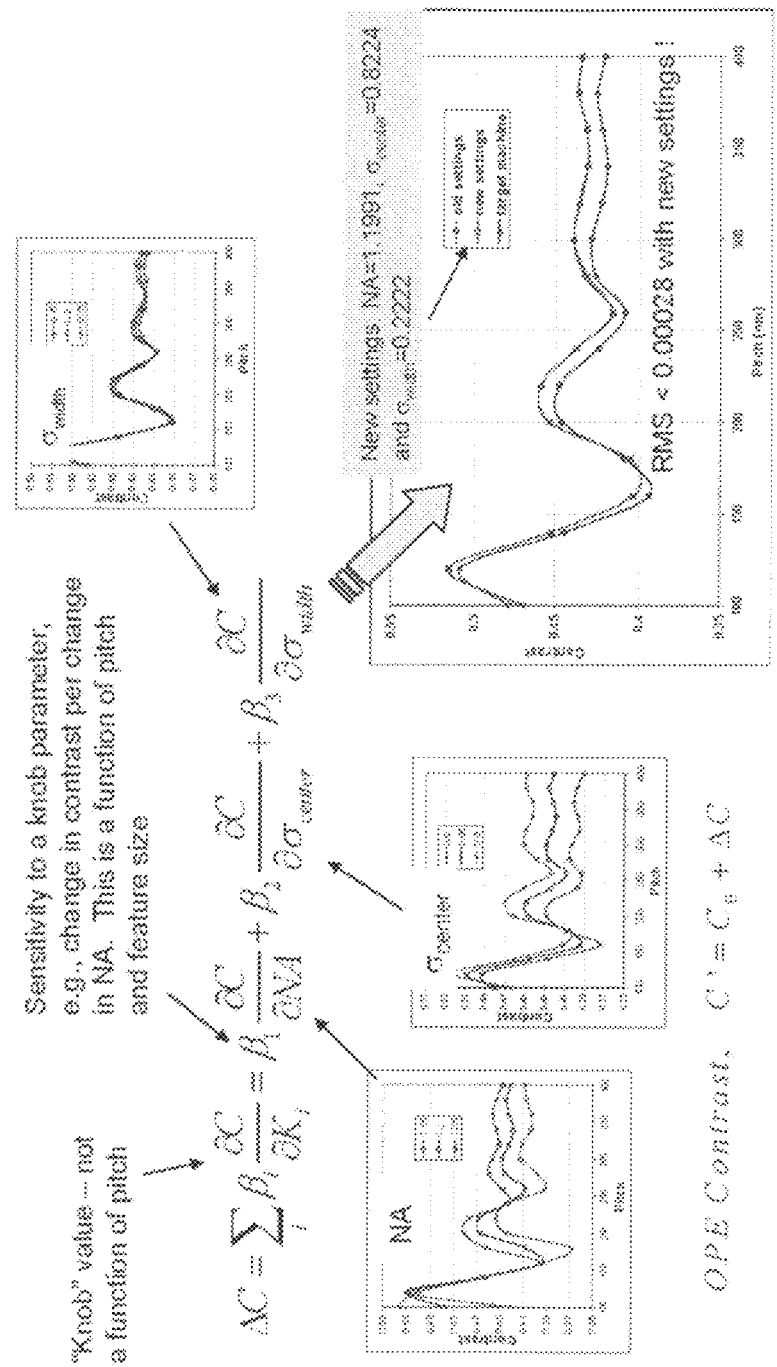
FIG. 18 is an example of how the method of the present invention can be used to match (or control) the signature characteristics of a scanner.

Still further, in accordance with the method of the present invention, at least one predetermined feature of at least one of the first and second scanners can be controlled based on the comparison of the first and second sets of signature characteristics. The underlying concept for controlling scanner parameters (using the contrast metric as an example), in the method of the present invention, is shown in FIG. 18, where the following technique is used:
   a.—Establish basic linear model.
   b.—Determine change in contrast versus feature type.
      i.—where ΔC is given by the following sum (example 3 variables)
   c.—Repeat using feedback to determine highest sensitivity 2D features It should also be noted that while the foregoing example describes a matching technique using a linear model, the method of the present invention can be implemented in various other ways, e.g. with a non-linear optimization technique to do the matching.

Thus, the present invention provides a way of determining the sensitivities of a scanner with respect to any or all of the signature characteristics of the scanner, and then perform a fitting (or adjustment) of features of the scanner using the additional "knobs" of the scanner. Applicants further note that there are no restrictions on the number of factors that can be analyzed for sensitivity or change, but the higher the number the more complex the analysis will be. The method of the present invention is designed to enable at least one predetermined feature of at least one scanner to be controlled, based on the comparison of the first and second sets of signature characteristics produced from scans of the same mask, in order to match, or control features of different scanners.

Accordingly, from the foregoing description, those in the art will appreciate how to produce signature characteristics for matching features of an optical scanner against another scanner, or against target scanner signature characteristics, based on a scan of the same mask by another optical scanner that produces target scanner signature characteristics. With the foregoing disclosure in mind, the manner in which the method of the present invention can be used in matching various signature characteristics of scanners will be apparent to those in the art.

The invention claimed is:

1. A method for matching first and second optical scanners, comprising
    a. scanning a mask on a first optical scanner, producing a first image from the scan of the mask by the first optical scanner, and producing from the first image a first set of signature characteristics;
    b. scanning the same mask on a second optical scanner, producing a second image from the scan of the mask by the second optical scanner, and producing from the second image a second set of signature characteristics; and
    c. comparing the first and second sets of signature characteristics in predetermined ways designed to match features of the first and second scanners.

2. The method of claim 1, wherein the first image comprises a first image in a first predetermined medium, and second image comprises second image in the same type of predetermined medium.

3. The method of claim 2, wherein the first image comprises a first aerial image and the second image comprises a second aerial image.

4. The method of claim 3, wherein each of the first and second aerial images is produced from a one dimensional scan of a two dimensional pattern on the mask.

5. The method of claim 4, wherein each of the first and second sets of signature characteristics comprises any or all of line widths, line gaps and pitch.

6. The method of claim 3, wherein the mask includes a pattern that is predetermined to enable the first and second aerial images to produce data that comprises the signature characteristics of the first and second scanners.

7. The method of claim 1, including controlling at least one predetermined feature of at least one of the first and second scanners based on the comparison of the first and second sets of signature characteristics.

8. A method for matching signature characteristics of an optical scanner to a set of target scanner signature characteristics, comprising
    a. producing the target scanner signature characteristics by producing a first image from a first scan of a mask, and producing from the first image a first set of signature characteristics that forms the target scanner signature characteristics;
    b. scanning the same mask on the optical scanner being matched to the target scanner characteristics, producing a second image from the scan of the mask by the optical scanner, and producing from the second image a second set of signature characteristics that characterize the scanner; and
    c. comparing the target scanner signature characteristics with the signature characteristics of the scanner in predetermined ways designed to match features of the scanner to the target scanner characteristics.

9. The method of claim 8, wherein the first image is produced in a first predetermined medium, and the second image is produced in the same type of predetermined medium.

10. The method of claim 9, wherein the first image comprises a first aerial image and the second image comprises a second aerial image.

11. The method of claim 10, wherein each of the first and second aerial images is produced from a one dimensional scan of a two dimensional pattern on the mask.

12. The method of claim 11, wherein each of the sets of signature characteristics comprises any or all of line widths, line gaps and pitches.

13. The method of claim 9, wherein the mask includes a pattern that is predetermined to enable the first and second aerial images to produce data that comprises the signature characteristics of the target scanner and the scanner.

14. The method of claim 8, including controlling at least one predetermined feature of the scanner based on the comparison of the target scanner signature characteristics with the signature characteristics of the scanner.

* * * * *